US005591288A

United States Patent [19]

Becker et al.

[11] Patent Number: 5,591,288
[45] Date of Patent: Jan. 7, 1997

[54] CONTOURED TIRE BUILDING DRUM AND METHOD OF BUILDING AN EXTENDED MOBILITY TIRE

[75] Inventors: Michael L. Becker, Akron; Klaus Beer, Stow; Kenneth D. Conger, Munroe Falls, all of Ohio

[73] Assignee: The Goodyear Tire & Rubber Company, Akron, Ohio

[21] Appl. No.: 316,865

[22] Filed: Dec. 2, 1994

Related U.S. Application Data

[63] Continuation of Ser. No. 92,214, Jul. 16, 1993, abandoned.

[51] Int. Cl.⁶ .............. B29D 30/20; B29D 30/26
[52] U.S. Cl. ............ 156/130.7; 152/517; 156/123; 156/133; 156/400; 156/405.1; 156/414; 156/416; 156/417
[58] Field of Search .............. 156/110.1, 414–420, 156/123, 130, 130.3, 133, 135, 400, 401, 130.7; 152/516, 517, 555

[56] References Cited

U.S. PATENT DOCUMENTS

| | | | |
|---|---|---|---|
| 3,077,917 | 2/1963 | Appleby | 156/416 |
| 3,542,108 | 11/1970 | Rye | 152/360 |
| 3,816,218 | 6/1974 | Felten | 156/416 |
| 3,864,189 | 2/1975 | Galleithner et al. | 156/415 |
| 4,060,445 | 11/1977 | Houck et al. | 156/414 |
| 4,072,550 | 2/1978 | Stalter, Jr. | 156/123 |
| 4,203,481 | 5/1980 | Ranik, Jr. | 152/330 |
| 4,206,010 | 6/1980 | Gutknecht | 156/415 |
| 4,229,246 | 10/1980 | Vanderzee | 156/417 |
| 4,247,356 | 1/1981 | Spach et al. | 156/416 |
| 4,265,288 | 5/1981 | Kaneko et al. | 152/209 |
| 4,508,586 | 4/1985 | Brown et al. | 156/401 |
| 5,116,449 | 5/1992 | Fabris et al. | 156/415 |

FOREIGN PATENT DOCUMENTS

| | | |
|---|---|---|
| 4-284228 | 10/1992 | Japan . |
| 1328227 | 10/1985 | U.S.S.R. . |
| 1717402 | 7/1990 | U.S.S.R. . |
| 2087805 | 6/1982 | United Kingdom . |

*Primary Examiner*—Geoffrey L. Knable
*Attorney, Agent, or Firm*—Frederick K. Lacher

[57] ABSTRACT

Tire components are assembled on a tire building drum by laying a first liner on a surface of the drum, positioning first sidewall inserts below the cylindrical surface of the drum and around the drum at insert locations spaced from each end of the drum, laying a first carcass ply around the drum, positioning second inserts over the first ply at the insert locations, laying a second carcass over the first ply and the second inserts, positioning beads at each end of the drum, expanding the drum to increase the diameter of the cylindrical surface of the drum and provide shoulders at each end of the drum, turning edges of the first ply and the second ply over each of the beads, positioning a belt and tread assembly around the second ply, and contracting the drum for removal of the assembled tire components from the drum. The inserts are positioned in grooves extending radially inwardly in the outer surface of the building drum. The grooves enable thick inserts to be built into the tire sidewall while still maintaining a generally flat outer surface of the tire while on the building drum, thereby decreasing the possibility of air trapped between components of the uncured tire.

13 Claims, 7 Drawing Sheets

CONTOURED TIRE BUILDING DRUM AND METHOD OF BUILDING AN EXTENDED MOBILITY TIRE

This is a Continuation, of application Ser. No. 08/092,214 filed Jul. 16, 1993, now abandoned.

This invention relates to mechanical tire building drums for building extended mobility pneumatic tires, and more specifically to a tire building drum having contours or depressions in its surface to facilitate building certain tire designs.

Tire performance can be affected by adding components to the tire or by adjusting the location of tire components in the tire during the tire building process. During the tire building process, it is important that components fit together well with a minimum of wrinkling of the tire components or trapping of air between the components. If air is trapped between the uncured tire components, the tire may be defective and may have to be scrapped. During the tire building process, if it appears the air has been trapped between tire components, the tire builder must stitch the interfaces between the uncured elastomeric components to work any bubbles or trapped air from between the components. This stitching involves rolling a roller wheel along the components, forcing the air to an edge of a component where it can escape. The stitching process is time consuming and requires the skill of the tire builder.

This problem is further magnified in tire designs where components are rather thick compared to other components. For example, when a component having a relatively square cross-section, such as a tire bead, is positioned adjacent a more planar component, such as a ply, the air may be trapped where the different-shaped components interface. In tire designs where different-shaped components are necessarily placed next to each other, the problem of trapped air is even more difficult.

In one particular extended mobility tire design, inserts are positioned in the sidewall between the carcass plies to enable the tire to support the weight of the vehicle even if the tire should lose inflation pressure. These inserts are typically thicker than the plies which lie adjacent to them and it is important that this tire be built without trapping air between the plies and inserts. In accordance with the present invention, an inventive tire building method and drum have been designed which have features to accommodate the special production needs of such tires. These special features will be described hereinafter and contribute to the building of a quality tire without trapping air.

In accordance with one aspect of the present invention, there is provided a method of building a tire comprising the steps of forming a liner into a cylinder, positioning first inserts to indent the liner cylindrical surface circumferentially at axially spaced insert locations along the axis of the cylinder, laying a first ply of reinforcing material around the cylindrical surface of the liner and first insert, positioning second inserts over the first ply at the spaced insert locations, laying a second ply of reinforcing material over the first ply and the second inserts, positioning circular beads at each end of the cylinder, expanding the first ply and the second ply to increase the diameter of the cylinder between the circular beads to provide shoulders at each end of the cylinder, turning edges of the first ply around the second ply over each of the beads, and positioning a belt and tread assembly around the second ply to form a precured tire.

In accordance with another aspect of the invention, there is provided a method of assembling tire components on a tire building drum having a cylindrical surface comprising the steps of laying a liner on the surface of the drum, positioning first inserts below the cylindrical surface and around a drum at insert locations spaced from each end of the drum, laying a first ply of reinforcing material around the drum over the cylindrical surface of the liner and first insert, positioning second inserts over the first ply at the insert locations spaced from each end of the drum, laying a second ply of reinforcing material over the first ply and the second inserts, positioning circular beads at each end of the drum, expanding the drum to increase the diameter of the cylindrical surface and provide shoulders at each end of the drum, turning edges of the first ply and the second ply over each of the beads, positioning a belt and tread assembly around the second ply, and contracting the drum for removal of the assembled tire components from the drum.

In accordance with still another aspect of the present invention a tire building drum has been provided which has a cylindrical surface, circular grooves in the surface at insert locations spaced from each end of the drum for positioning of first inserts below the surface, means for applying a first ply over the cylindrical surface, means for applying second inserts over the first ply and the first inserts, means for applying a second ply over the first ply and second insert, means for expanding the drum providing shoulders at each end of the drum for applying bead rings, means for turning up ends of the first ply around the beads, means for applying a belt and tread assembly around the second ply and means for contracting the drum to remove the assembled tire from the drum.

IN THE DRAWINGS

DESCRIPTION OF THE PREFERRED EMBODIMENT

Figure 1:
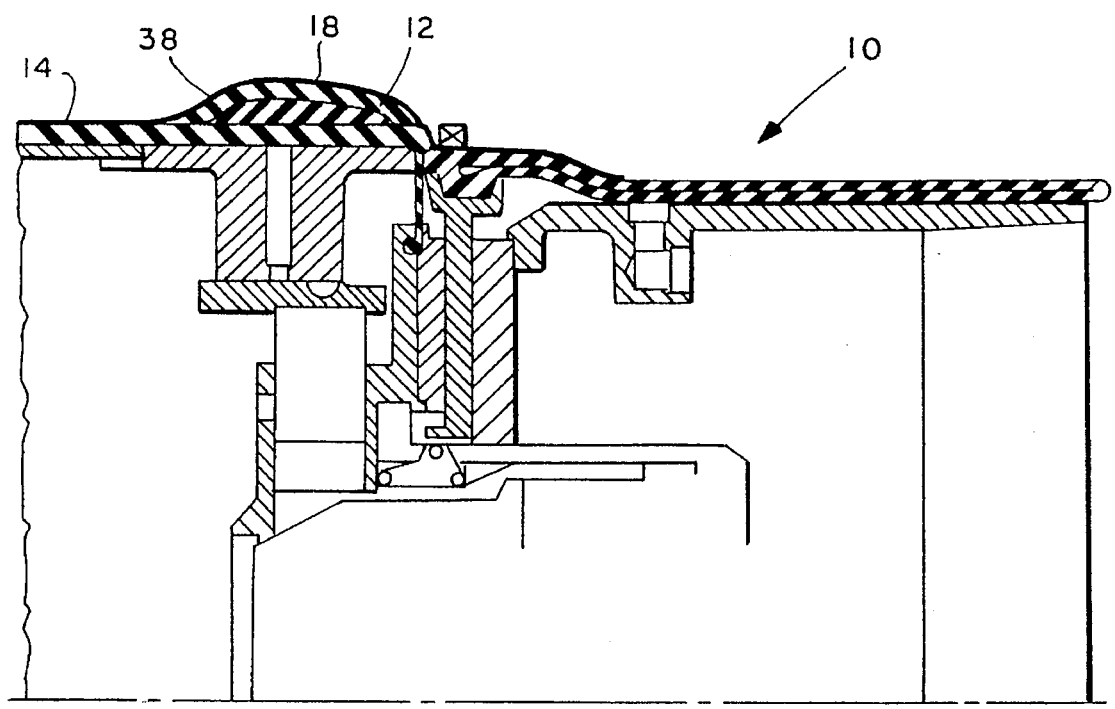
FIG. 1 is a side cross-sectional view of an end portion of a tire building drum with a partially constructed green tire according to the prior art.

With reference to FIG. 1, a tire building drum 10 according to the prior art is shown. The drum 10 has a variety of internal parts which may be selectably movable to position various components of the uncured tire during different stages of the tire building process.

With continuing reference to FIG. 1, a drum 10 is shown with some components 12 of an uncured tire 38 placed on an outer surface 14 of the drum. The tire components 12 applied thus far in the tire building process as shown in FIG. 1 create a non-planar protrusion 18. As has been discussed previously, uncured tire components 12 which are non-planar may create pockets of trapped air. These pockets of trapped air may lead to premature tire failure and poor tire performance.

In accordance with the present invention a groove 20 is provided in the outer surface 14 of the tire building drum 10 to accommodate such protrusion 18 and provide a more planar surface for the addition of subsequent tire components 12 during the tire building process.

Although the above-stated problem and solution could be applicable to a wide variety of tire designs, it is especially applicable in tire designs having unusually thick sidewalls, such as is found in some extended mobility tires. In these tires, tire sidewalls are especially thick, often including sidewall inserts between layers of the carcass ply. The inserts act to support the vehicle load even if the tire loses its inflation pressure.

Figure 12:
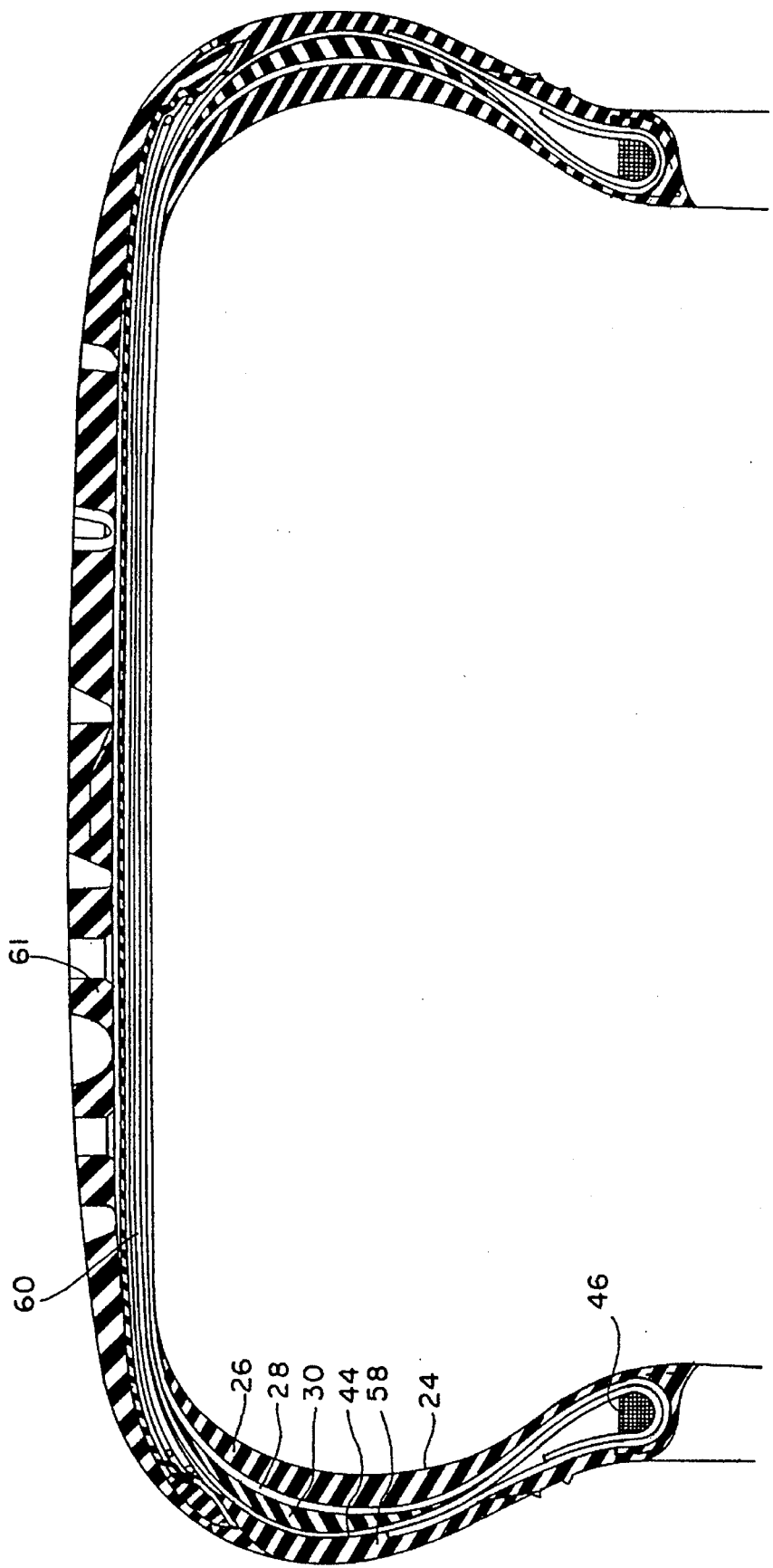
FIG. 12 is a cross-sectional view of a cured tire built on a tire building drum according to the invention.

With reference to FIG. 12, a tire featuring sidewall inserts is shown to illustrate one type of tire which can be built on the apparatus and according to the method as described herein. The sidewall region of the tire is especially thick, due to the presence of first insert 26 and second insert 30. As can be seen with reference to FIG. 12, looking from the interior of the tire toward the exterior, the liner 24 lies adjacent the first sidewall insert 26, followed by the first carcass ply 28, the second sidewall insert 30, the second carcass ply 44, and finally the sidewall 58 itself. The carcass of the tire is surrounded by a belt package 60 and tread 61. In the particular embodiment shown, the tire is a low profile high performance tire which utilizes the sidewall inserts 26,30 to support the vehicle if the tire should lose its inflation pressure.

Figure 2:
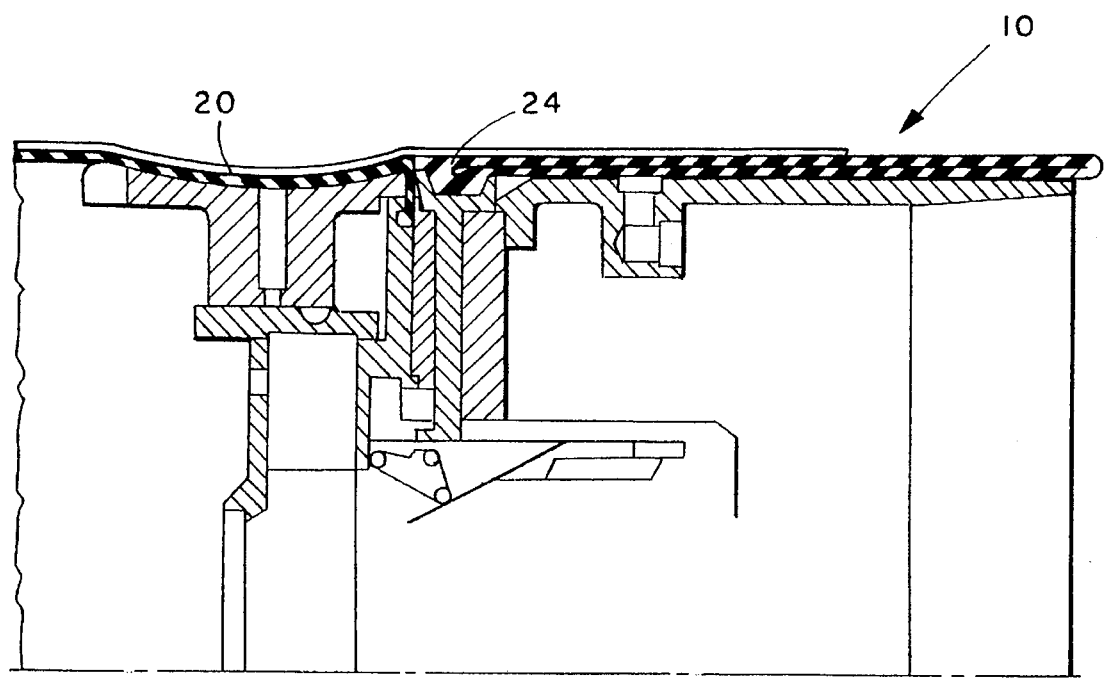
FIG. 2 is a cross-sectional view like FIG. 1 of an end portion of a tire building drum built in accordance with the invention showing the liner in place on the tire building drum.

With reference to FIG. 2, a tire building drum 10 according to the invention is shown. In the drum 10 shown in FIG. 2, the drum has been provided with a groove 20. The groove 20, which can also take the form of a depression or recess, is especially configured to receive certain uncured tire components 12. In the embodiment shown, the groove 20 is configured to receive sidewall inserts 26,30.

Figure 8:
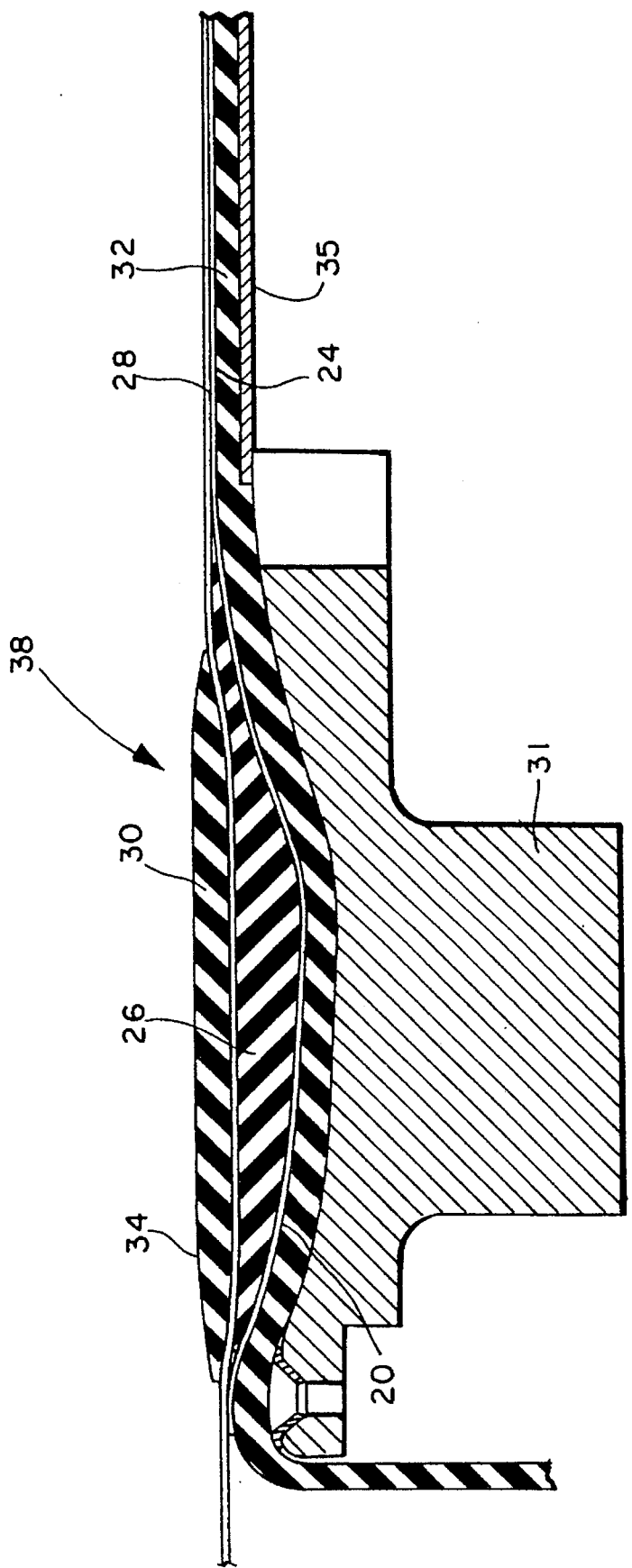
FIG. 8 is an enlarged cross-sectional view of one of the grooves in the tire building drum surface according to the invention.

With reference to FIG. 8, an enlarged cross-sectional view of a tire building drum 10 featuring a groove 20 according to the invention is shown. The drum 10 may have a drum spacer 31 and a drum sleeve 32 with a drum cover plate 35. In FIG. 8, the groove 20 is shown as having already received a liner 24, a first sidewall insert 26, a first carcass ply 28 and a second sidewall insert 30. The first insert 26 is not symmetrically-shaped. As can be seen in FIG. 8, even though the first and second sidewall inserts 26, 30 are non-planar, due to the contour of groove 20, the upper surface 34 of the unfinished, uncured tire 38 in-process is generally planar. Therefore, the next tire component, in this case the second carcass ply 44, can be applied in a generally planar fashion.

Figure 3:
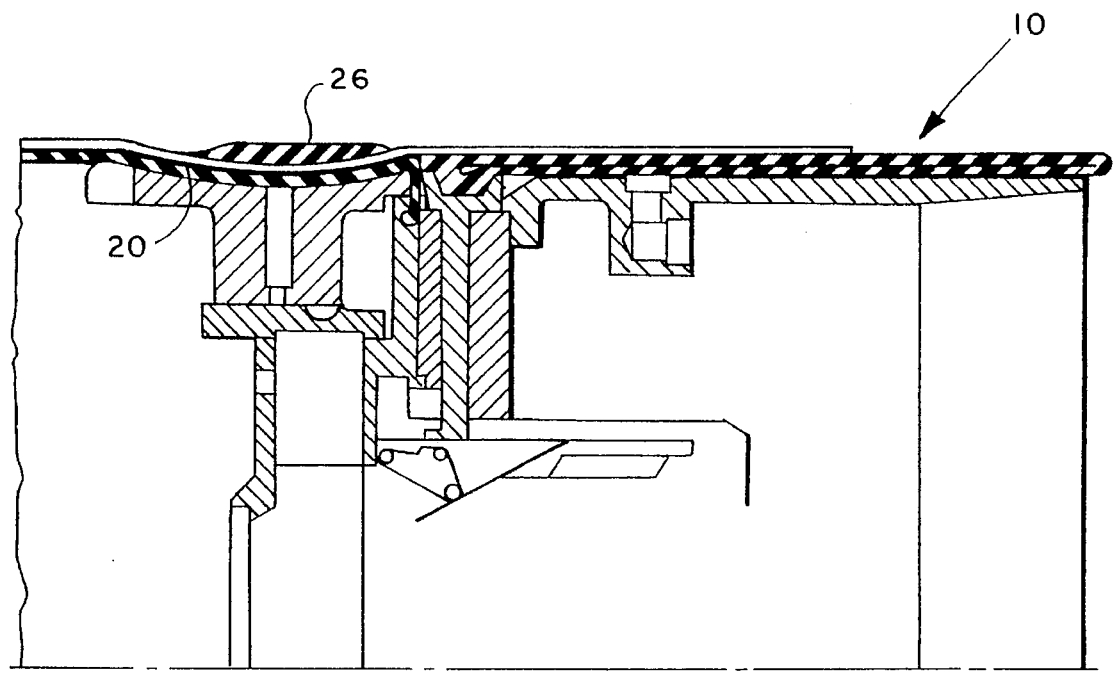
FIG. 3 is a cross-sectional view like FIG. 2 showing the liner and first insert placed on the tire building drum.
Figure 4:
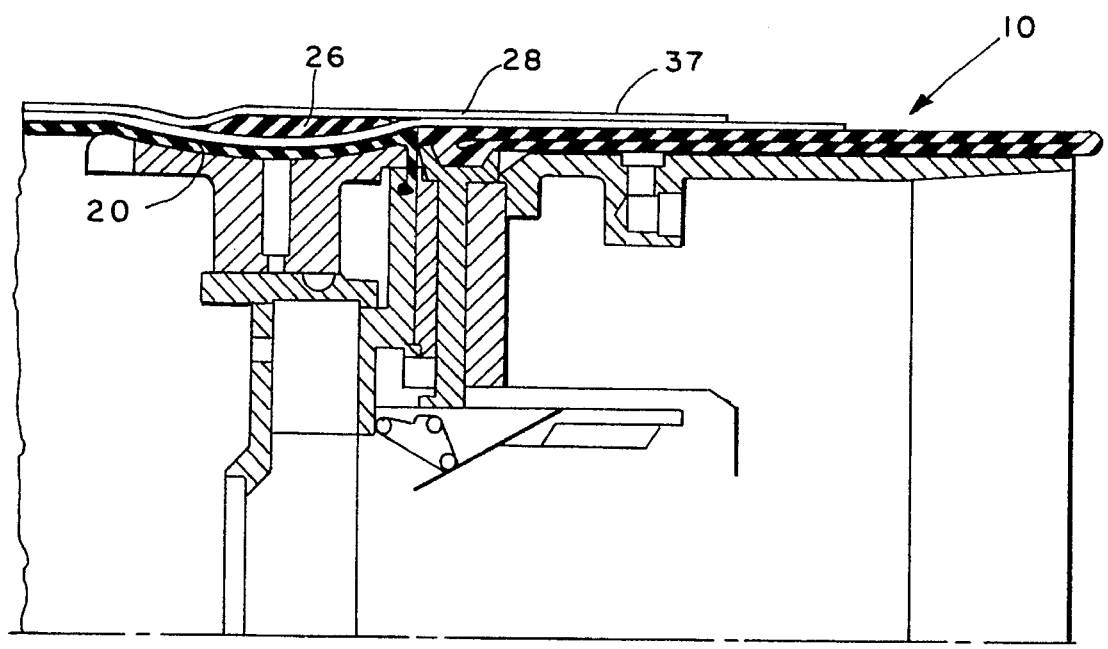
FIG. 4 is a cross-sectional view like FIG. 3 showing the liner, first insert, and first ply in place on the tire building drum.
Figure 5:
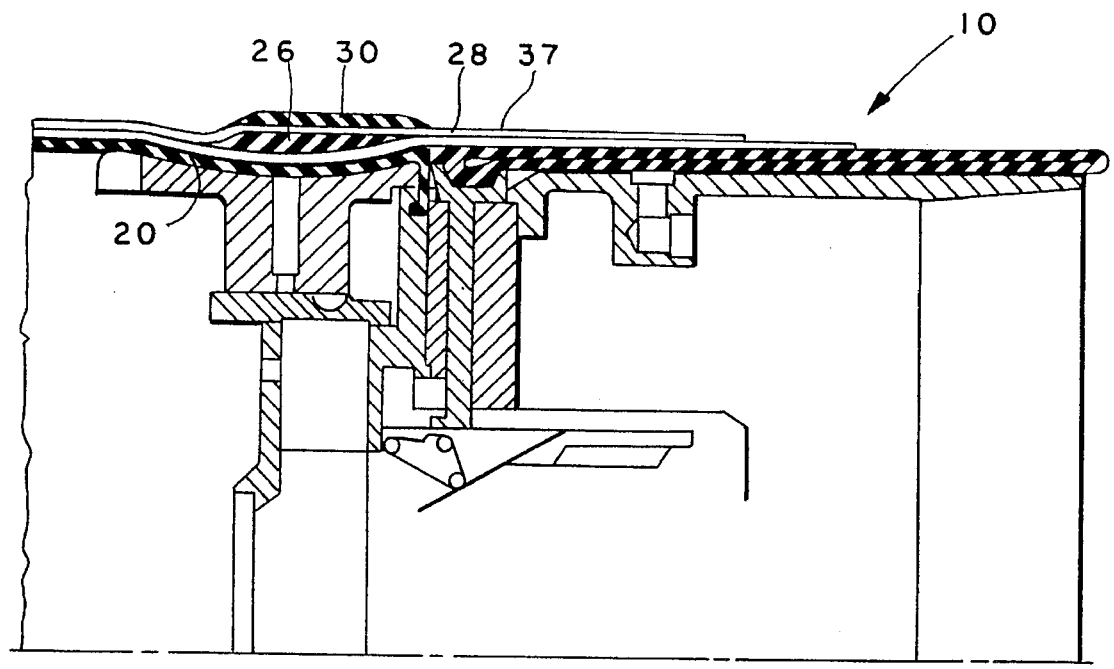
FIG. 5 is a cross-sectional view like FIG. 4 showing the liner, first insert, first ply, and second insert in place on the tire building drum.
Figure 6:
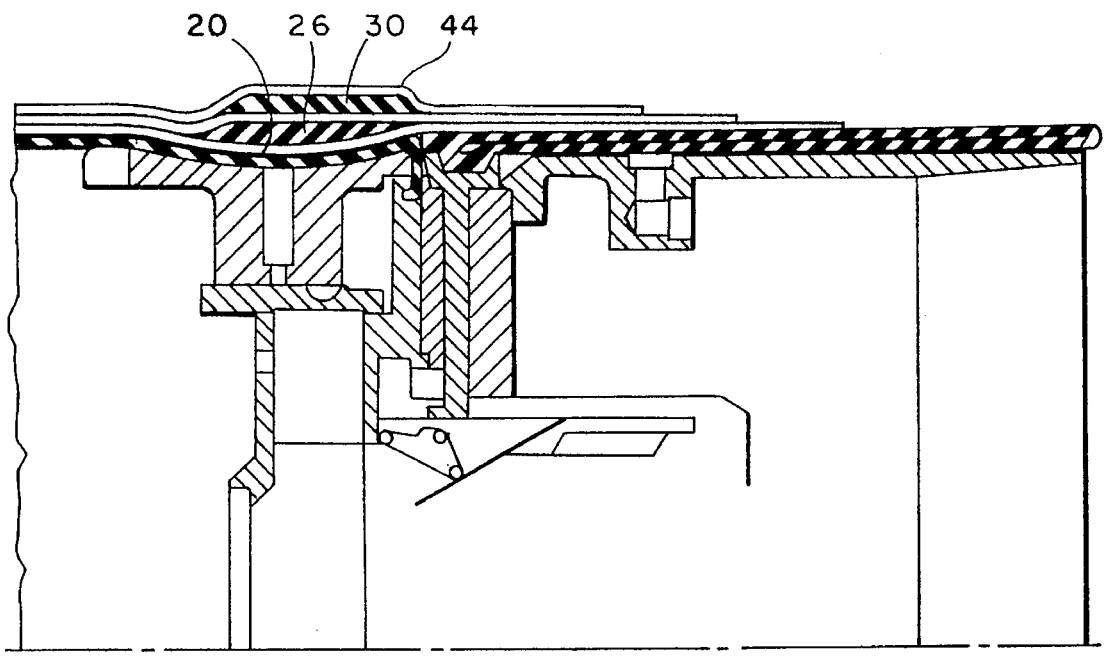
FIG. 6 is a cross-sectional view like FIG. 5 showing the liner, first insert, first ply, second insert, and second ply in place on the tire building drum.
Figure 7:
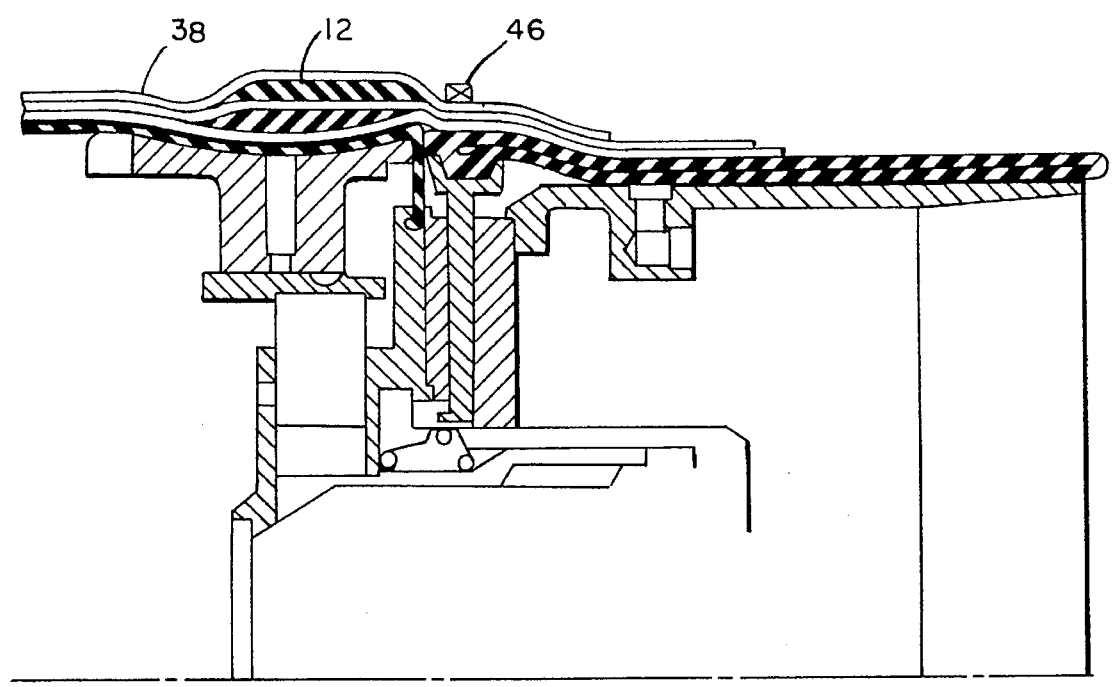
FIG. 7 is a cross-sectional view like FIG. 6 showing the liner, first insert, first ply, second insert, second ply and bead in place on the tire building drum.

With reference to FIGS. 2–7, the preliminary stages of the green tire building process will be described so that the benefits of the groove 20 in the tire building drum 10 will be more easily appreciated. With reference to FIG. 2, the tire building drum 10 is shown with the liner 24 applied. With reference to FIG. 3, a first sidewall insert 26 has been added on top of the liner 24. The first insert 26 fits into the groove 20. With reference to FIG. 4, the next component, the first carcass ply 28, has been added. The upper surface 37 of the first carcass ply 28 is nearly flat and planar. With reference to FIG. 5, the next component in this particular tire 38, the second sidewall insert 30 has been added. The outer surface 40 of the second sidewall insert 30 is also generally planar. Because of this, with reference to FIG. 6, the second carcass ply 44 can be added to the in-process tire 38 and still maintain a generally flat, planar shape. With reference to FIG. 7, the in-process tire 38 has been fitted with a bead 46 and is ready for the turnup of the carcass plies 28,44 around the bead.

Figure 9:
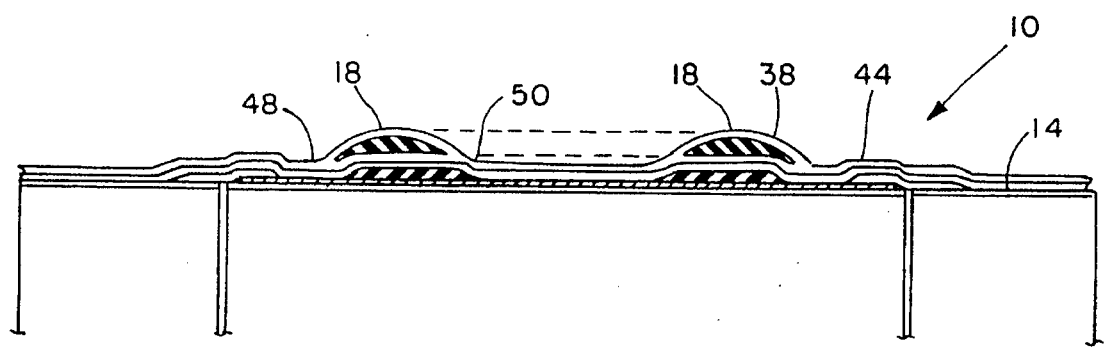
FIG. 9 is a schematic, cross-sectional view of a tire building drum according to the prior art.

With reference to FIG. 9, an in-process tire 38 featuring sidewall inserts 26,30 is shown as it would look if built on a typical prior art tire building drum without contours or grooves. As can be seen, the area of the sidewall inserts 26,30 protrudes significantly upwardly from the outer surface 14 of the tire building drum 10 and creates significant protrusions 18 in the area shown at 48 and 50. Subsequent tire components such as the second carcass ply 44 are difficult to force into such a nonplanar contour. At locations 48 and 50, air can be trapped within the tire, leading to the aforementioned problems.

Figure 10:
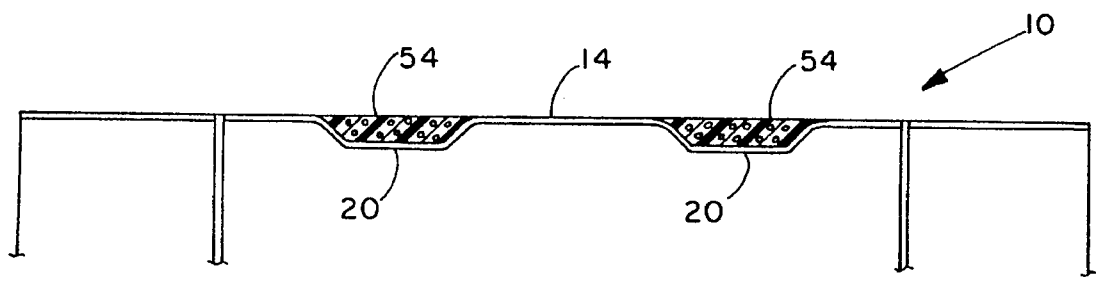
FIG. 10 is a schematic, cross-sectional view of a tire building drum with grooves according to the invention, with the grooves being filled with rings of resilient rubber-like material.
Figure 11:
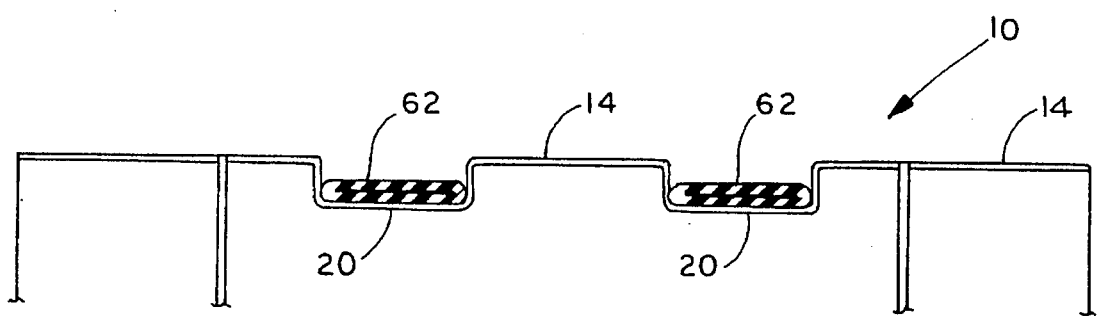
FIG. 11 is a side cross-sectional view of a tire building drum according to the invention where the grooves are filled with inflatable bladders.

However, with reference to FIGS. 10 and 11, the benefits of two modifications of the invention are clearly seen. In FIG. 10, the tire building drum 10 is provided with grooves 20. In the embodiment shown, the grooves 20 are filled with rings 54 of resilient material such as polyurethane foam to provide a flat surface for applying the liner 24. Later, when the inserts 26,30 are to be applied they, along with the portion of the liner 24 laying beneath them, may be resiliently depressed into the rings 54 of resilient material.

With reference to FIG. 11, the grooves 20 are shown with a more rectangular cross-sectional shape. In this embodiment, bladders 62 are fitted within the grooves 20 and can be selectively inflated to provide a flat surface for applying the liner 24. Later, when the inserts 26,30 are to be applied the bladders 62 can be deflated.

The method of building a tire 38 which is disclosed herein includes the steps of forming a liner 24 into a cylinder, positioning first inserts 26 to indent the liner 24 cylindrical surface circumferentially at axially spaced insert locations along the axis of the cylinder, laying a first ply 28 of carcass ply reinforcing material around the cylindrical surface of the liner, positioning the second inserts 30 over the first carcass ply 28 at the spaced insert locations, laying a second carcass ply 44 of reinforcing material over the first carcass ply 28 and the second inserts 30, positioning circular beads 46 at each end of the cylinder, expanding the first carcass ply and the second carcass ply to increase the diameter of the cylinder between the circular beads to provide shoulders at each end of the cylinder, turning edges of the first carcass ply around the second carcass ply over each of the beads, and positioning a belt and tread assembly around the second ply to form a precured tire. Preferably the first inserts 26 and second inserts 30 at their thickest points are at least twice as thick as either of the first carcass ply 28 or the second carcass ply 44. The first inserts 26 may not be symmetrically shaped and the first inserts 26 and second inserts 30 extend generally from the beads 46 to the belt and tread assembly.

While a certain representative embodiment and details have been shown for the purpose of illustrating the invention, it will be apparent to those skilled in the art that various changes and modifications may be made therein without departing from the spirit or scope of the invention.

What is claimed is:

1. A method of building an extended mobility tire with inserts on a tire building drum, said inserts being significantly thicker than other adjacent tire components; said tire building drum having a cylindrical surface with grooves therein, said grooves containing inflatable circular bodies therein, said method comprising:

laying a liner on said surface of said drum, said inflatable circular bodies being in a first position in line with said cylindrical surface;

deflating said circular bodies to a second position below said cylindrical surface;

positioning first inserts in said grooves and on said circular bodies below said cylindrical surface and around said drum at insert locations spaced from each end of said drum;

laying a first ply of reinforcing material around said drum over said liner and said first insert;

positioning second inserts over said first ply at said insert locations spaced from each end of said drum;

laying a second ply of reinforcing material over said first ply and said second inserts;

positioning circular beads at each end of said drum;

expanding said drum to increase the diameter of said cylindrical surface and provide shoulders at each end of said drum;

turning edges of said first ply and said second ply over each of said beads;

positioning a belt and tread assembly around said second ply; and, contracting said drum for removal of the assembled tire components from said drum.

2. The method of claim 1 wherein each of said grooves has a depth greater than the thickness of any one of said inserts.

3. The method of claim 2 wherein said depth of each of said grooves is equal to at least the thickness of each of said first inserts plus ½ the thickness of each of said second inserts.

4. A tire building apparatus for assembling tire components including inserts for extended mobility capabilities, said apparatus comprising a drum having a cylindrical surface, circular grooves in said cylindrical surface at insert locations spaced from each end of said drum for positioning of first inserts below said surface, means for applying said first inserts, inflatable circular bodies in said circular grooves, means for selectively inflating or deflating said circular bodies away from or toward said cylindrical surface, means for applying a first ply over said cylindrical surface, means for applying second inserts over said first ply and said first inserts, means for applying a second ply over said first ply and said second inserts, means for expanding said drum providing shoulders at each end of said drum for applying bead rings, means for turning up ends of said first ply around said beads, means for applying a belt and tread assembly around said second ply and means for contracting said drum to remove said assembled tire from said drum.

5. The tire building drum of claim 4 wherein each of said circular grooves has a depth greater than the thickness of each of said inserts.

6. The tire building drum of claim 5 wherein said depth of each of said grooves is equal to at least the thickness of each of said first inserts plus one half the thickness of each of said second inserts.

7. A method of building an extended mobility tire with inserts on a tire building drum, said inserts being significantly thicker than other adjacent tire components; said tire building drum having a cylindrical surface with grooves therein, said grooves containing resilient compressible circular bodies therein, said method comprising:

laying a liner on said surface of said drum;

positioning first inserts over said grooves and on said circular bodies;

depressing said first inserts into said resiliently compressible circular bodies;

laying a first ply of reinforcing material around said drum over said cylindrical surface of said liner and said first insert;

positioning second inserts over said first ply at insert locations spaced from each end of said drum;

laying a second ply of reinforcing material over said first ply and said second inserts;

positioning circular beads at each end of said drum;

expanding said drum to increase the diameter of said cylindrical surface and provide shoulders at each end of said drum;

turning edges of said first ply and said second ply over each of said beads;

positioning a belt and tread assembly around said second ply; and, contracting said drum for removal of the assembled tire components from said drum.

8. The method of claim 7 wherein said circular bodies are rings of resilient polyurethane foam.

9. The method of claim 7 wherein said circular bodies are made of polyurethane.

10. The method of claim 7 wherein said compressible circular bodies have an outer diameter substantially the same as the diameter of said cylindrical surface of said drum and are resiliently deformable radially inwardly to position said first inserts to positions below said cylindrical surface.

11. A tire building apparatus for assembling tire components including inserts for extended mobility capabilities, said apparatus comprising a drum having a cylindrical surface, circular grooves in said cylindrical surface at insert locations spaced from each end of said drum for positioning of first inserts below said surface, compressible circular bodies in said grooves for resiliently supporting said first inserts radially inwardly below said cylindrical surface; means for applying a first ply over said cylindrical surface, means for applying said first inserts over said first ply, means for applying second inserts over said first ply and said first inserts, means for applying a second ply over said first ply and second insert, means for expanding said drum providing shoulders at each end of said drum for applying bead rings, means for turning up ends of said first ply around said beads, means for applying a belt and tread assembly around said second ply and means for contracting said drum to remove said assembled tire from said drum.

12. The tire building drum of claim 11 wherein said compressible circular bodies are rings of resilient material.

13. The tire building drum of claim 12 wherein said resilient material is polyurethane.

* * * * *